US009719791B2

(12) United States Patent
Hall et al.

(10) Patent No.: US 9,719,791 B2
(45) Date of Patent: Aug. 1, 2017

(54) COMPUTERIZED SYSTEMS AND METHODS FOR PROVIDING TRAVEL INFORMATION AND/OR CONTENT TO USERS

(71) Applicant: Mapquest, Inc., Denver, CO (US)

(72) Inventors: Sue Anne Hall, Denver, CO (US); Kacy Nikole Beitel, Denver, CO (US)

(73) Assignee: Mapquest, Inc., Denver, CO (US)

( * ) Notice: Subject to any disclaimer, the term of this patent is extended or adjusted under 35 U.S.C. 154(b) by 0 days.

(21) Appl. No.: 14/566,643

(22) Filed: Dec. 10, 2014

(65) Prior Publication Data

US 2016/0169695 A1    Jun. 16, 2016

(51) Int. Cl.
*G01C 21/00*    (2006.01)
*G01C 21/34*    (2006.01)
*G06Q 30/02*    (2012.01)
*G01C 21/36*    (2006.01)

(52) U.S. Cl.
CPC ..... *G01C 21/3476* (2013.01); *G01C 21/3484* (2013.01); *G01C 21/3644* (2013.01); *G01C 21/3655* (2013.01); *G01C 21/3679* (2013.01); *G06Q 30/0261* (2013.01)

(58) Field of Classification Search
None
See application file for complete search history.

(56) References Cited

U.S. PATENT DOCUMENTS

| 7,212,920 B1* | 5/2007 | Bailey | G01C 21/367 340/961 |
|---|---|---|---|
| 2002/0138196 A1* | 9/2002 | Polidi | G01C 21/3682 701/409 |
| 2007/0219706 A1 | 9/2007 | Sheynblat | |
| 2009/0012953 A1 | 1/2009 | Chu et al. | |
| 2009/0150349 A1 | 6/2009 | Cartin et al. | |
| 2010/0305842 A1 | 12/2010 | Feng | |
| 2014/0278056 A1* | 9/2014 | Williams | G01C 21/3476 701/410 |

(Continued)

OTHER PUBLICATIONS

"London Travel Guide and Offline City Map by Ulmon GmbH", Retrieved From the Internet: https://itunes.apple.com/us/app/london-travel-guide-offline/id317451315?mt=8, on Mar. 17, 2015, 5 pages.

(Continued)

*Primary Examiner* — Lail Kleinman

(57) ABSTRACT

Systems and methods are disclosed for providing travel information and/or content to users. According to certain embodiments, an area of interest is calculated based on a determined location of a user traveling along a route and a relative distance of travel. The area of interest is associated with coordinates on a map and includes at least a triangular area or a radial area. At least one database is searched to identify travel information and/or content within the area of interest. The travel information and/or content is stored in the database and associated with coordinates on the map. Instructions are provided at a first point in time to electronically display the identified travel information and/or content on a device of the user. Further identified travel information and/or content is displayed to the user at subsequent points in time as the user travels along the route.

18 Claims, 9 Drawing Sheets

(56) References Cited

U.S. PATENT DOCUMENTS

2015/0160028 A1* 6/2015 Burrows ............ G01C 21/3423
701/527

OTHER PUBLICATIONS

"Gogobot—City & Travel Guide by Gogobot", Retrieved From the Internet: https://play.google.com/store/apps/details?id=com.gogobot.gogodroid&hl=en, on Mar. 17, 2015, 4 pages.
"Roadtrippers—Trip Planner by Roadtrippers", Retrieved From the Internet: https://play.google.com/store/apps/details?id=com.roadtrippers&hl=en, on Mar. 17, 2015, 4 pages.
"World Travel Guide by Triposo", Retrieved From the Internet: https://play.google.com/store/apps/details?id=com.triposo.droidguide.world&hl=en, on Mar. 17, 2015, 5 pages.
"Time Travel eXplorer—London Pro, by Time Travel eXplorer", Retrieved From the Internet: https://itunes.apple.com/gb/app/time-travel-explorer-london/id385938758?mt=8, on Mar. 17, 2015, 3 pages.
European Search Report for EP Application No. 15199273.2, dated Apr. 22, 2016.

\* cited by examiner

COMPUTERIZED SYSTEMS AND METHODS FOR PROVIDING TRAVEL INFORMATION AND/OR CONTENT TO USERS

BACKGROUND

Technical Field

The present disclosure generally relates to the field of electronic mapping and navigation systems, and information retrieval techniques. More specifically, and without limitation, the exemplary embodiments described herein relate to computerized systems and methods for identifying and providing travel information and content to users.

Background

Electronic mapping and navigation systems have become useful tools for assisting users in identifying relevant travel information. Mapping and navigation systems, including those available online and through client applications, can provide various types of travel information, including points-of-interest, business names, phone and address information, hours of operation, reviews, and other useful information. Users may use these systems to find relevant location and other travel information, and discover points-of-interest that may appeal to them.

Some users may desire to automatically receive travel information and/or content. For example, a user traveling along a route may desire to automatically receive information such as advertisements, images, videos, or audio recordings in an area of interest near or proximate to the user. Moreover, some users may desire to automatically receive notifications of points-of-interest that may appeal to the user. For example, a user traveling to a destination may be interested in making various stops for activities along their route, such as sites of historical significance or hiking. Such users may, therefore, desire to automatically receive notifications of nearby travel information or other content, such as guided kayaking tours or hiking trails.

Therefore, there is presently a need for improved systems and methods for providing travel information and/or content to users of electronic mapping and navigation systems. Moreover, there is a need for improved systems and methods that are capable of calculating one or more areas of interest to a user and identifying travel information and/or content within such areas of interest. Further still, there is a need for improved systems and methods that are capable of automatically providing users with relevant travel information and/or content as they travel along a route.

SUMMARY

Consistent with the present disclosure, computer-implemented systems and methods are provided for providing travel information and/or content to a user. Embodiments consistent with the present disclosure include computer-implemented systems and methods for identifying travel information and/or content within an area of interest, the area of interest being associated with coordinates on a map. In addition, systems and methods consistent with the present disclosure may provide instructions to electronically display the identified travel information and/or content on a device of the user.

In accordance with one exemplary embodiment, a computer-implemented method is provided for providing travel information and/or content to a user. The method includes determining a location of a user traveling along a route and calculating an area of interest based on the location of the user and a relative distance of travel. The area of interest may be associated with coordinates on a map and include at least one of a triangular area or a radial area. As part of the method, at least one database may be searched to identify travel information and/or content within the area of interest. At a first point in time, instructions may be generated to electronically display the identified travel information and/or content on a device of the user. The above operations may be automatically repeated at subsequent points in time, in order to electronically display further identified travel information and/or content to the user as the user travels along the route or updates their radial location.

In accordance with another exemplary embodiment, a system is provided for identifying points-of-interest using customized query prediction. The system includes a memory that stores a set of instructions and at least one processor in communication with the memory for executing the set of instructions. The at least one processor may be configured with the set of instructions to provide travel information and/or content to a user by determining a location of a user traveling along a route and calculating an area of interest based on the location of the user and a relative distance of travel. The area of interest may be associated with coordinates on a map and include at least one of a triangular area or a radial area. The at least one processor may further be configured to search at least one database to identify travel information and/or content within the area of interest. At a first point in time, instructions may be generated by the processor to electronically display the identified travel information and/or content on a device of the user. The above operations may be automatically repeated at subsequent points in time, in order to electronically display further identified travel information and/or content to the user as the user travels along the route or updates their radial location.

In accordance with yet another exemplary embodiment, a computer readable storage medium is provided including a set of instructions executable by at least one processor to perform a method for providing travel information and/or content to a user. The method includes determining a location of a user traveling along a route and calculating an area of interest based on the location of the user and a relative distance of travel. The area of interest may be associated with coordinates on a map and include at least one of a triangular area or a radial area. As part of the method, at least one database may be searched to identify travel information and/or content within the area of interest. Instructions may then be generated at a first point in time to electronically display the identified travel information and/or content on a device of the user. The above operations may be automatically repeated at subsequent points in time, in order to electronically display further identified travel information and/or content to the user as the user travels along the route or updates their radial location.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Embodiments of the present disclosure provide improved systems and methods for providing travel information and/or content to users. The disclosed embodiments may provide real-time location-specific travel information and/or content to users who are traveling to, from, or in destinations. Before or during a trip, users can specify parameters that control the amount and type of preferred travel information and/or content in order to have timely notifications and travel information and/or content presented to them when in or passing through an area. The travel information and/or content provide the user with information, such as historical facts or locations of landmarks and points-of-interest, that the user may not have known existed. Further, the travel information and/or content can provide the user with content associated with the landmarks and points-of-interest, such as time-lapse images, audio and video recordings, and advertisements. In some embodiments, content may be generated by users and uploaded to one or more databases for sharing with other users. In other embodiments, content may be generated and provided by service providers on a subscription or free basis to users.

The disclosed embodiments also provide improved systems and methods for calculating areas of interest and identifying travel information and/or content within the areas of interest. Areas of interest can be automatically calculated based on context-specific parameters such as, for example, user location, mode of travel, and velocity of user travel. Areas of interest can also be calculated based on user specified parameters such as size and shape. As such, the present disclosure provides systems and methods for calculating areas of interest that are convenient for the user to explore while traveling along a route or updating their radial location.

According to the disclosed embodiments, a location of a user traveling along a route may be determined and used to calculate an area of interest. One or more databases may be searched to identify travel information and/or content within the area of interest that may appeal to the user. Moreover, instructions for electronically displaying the identified travel information and/or content on a device of the user may be generated or provided. The process may be repeated in order to provide the user with relevant travel information and/or content as the user travels along a route.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Figure 1:
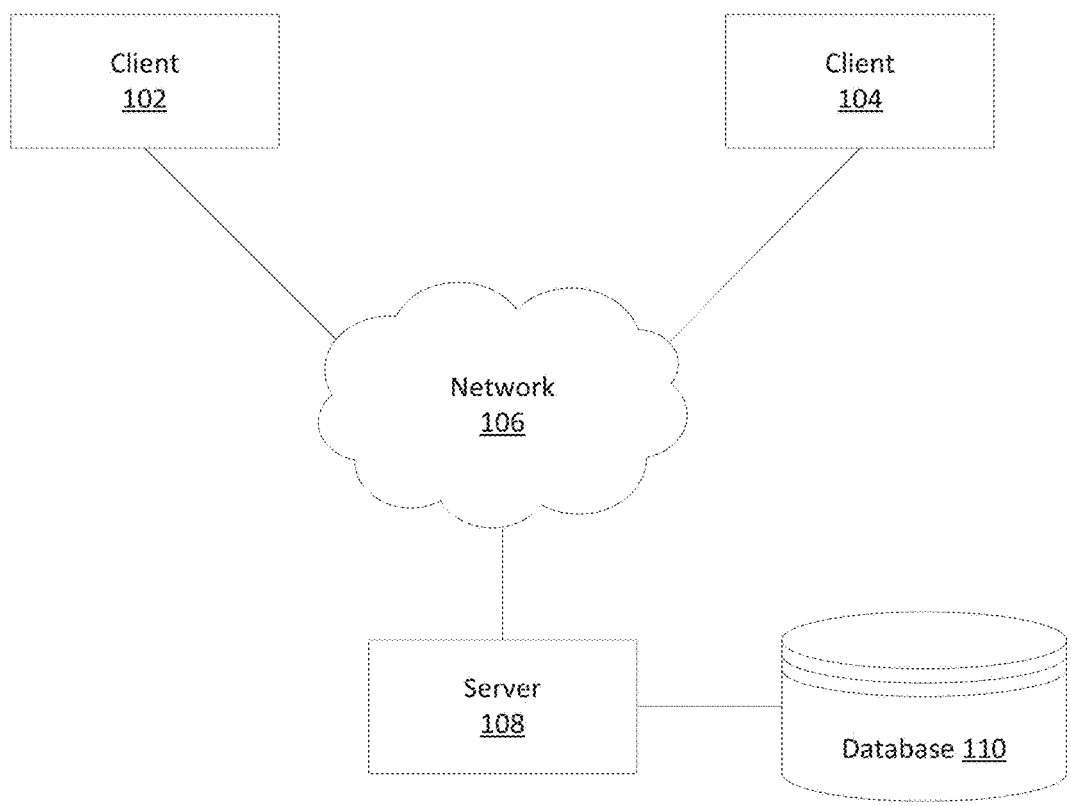
FIG. 1 is a diagram of an example system environment for implementing embodiments consistent with the present disclosure.

FIG. 1 depicts an exemplary system environment 100 for implementing embodiments of the present disclosure. As shown in FIG. 1, system environment 100 includes a number of components. It will be appreciated from this disclosure that the number and arrangement of these components is exemplary only and provided for purposes of illustration. Other arrangements and numbers of components may be utilized without departing from the teachings and embodiments of the present disclosure.

As shown in the example embodiment of FIG. 1, system environment 100 may include one or more user devices or clients 102, 104. By way of example, clients 102, 104 may include smartphones, tablets, navigation devices and systems, netbooks, electronic readers, personal digital assistants, personal computers, laptop computers, desktop computers, large display devices, and/or other types of electronics or communication devices. In some embodiments, clients 102, 104 are implemented with hardware devices and/or software applications running thereon. Also, in some embodiments, client 102 or 104 may implement aspects of the present disclosure without the need for accessing another device, component, or network, such as network 106.

In some embodiments, clients 102, 104 may transmit requests (e.g., requests based on input provided by one or more users), control parameters, location data, and other data through network 106 to an appropriate server, such as, for example, server 108. Network 106 may include any combination of communications networks. For example, network 106 may include the Internet and/or any type of wide area network, an intranet, a metropolitan area network, a local area network (LAN), a wireless network, a cellular communications network, etc.

In some embodiments, the request may include requests for navigation and/or routing information. Client 102, 104 may receive destination information (e.g., addresses, geographic coordinates, point-of-interest names, etc.) from a user along with a request for routing information and/or directions to the destination. Additionally, client 102, 104 may receive navigation and/or routing parameters specified by the user. The parameters may specify a type of routing information and/or directions. For example, the parameters may specify a request for driving directions, walking directions, public transportation directions, or a combination thereof. As another example, the parameters may specify a request for a route with the shortest traveling distance or shortest traveling time. The parameters may also specify one or more modifiers for generating the routing information and/or directions. For example, the parameters may specify that toll roads, highway roads, bridges, and/or specific towns, states, or countries are to be avoided. Clients 102, 104 may transmit the received request for navigation and/or routing information, destination information, and parameters to server 108.

In some embodiments, the requests may include requests for travel information and/or content. Travel information may include, for example, names, locations (e.g., addresses and/or geographic coordinates), hours of operation, descriptive information, contact information (e.g., telephone numbers, email addresses, web page addresses, etc.), and reviews of points-of-interest; articles, navigation directions, distances, and travel times to the points-of-interest from the user's current location; historical information associated with the points-of-interest or the general area near the user; and/or sale and promotion information (e.g., pricing, coupons, discounts, etc.). Travel information may also include curated lists of recommended travel destinations that can be used to organize and plan a user's trip. Travel content may include any of the travel information described above in the form of images or photographs, video recordings, audio recordings, or any combination thereof. For example, travel content may include a historical photograph of a point-of-interest near the user, the historical photograph reflecting how the point-of-interest looked at a previous point in time. As another example, travel content may include an audio recording of a review for a restaurant point-of-interest that was created by another user. As a further example, travel content may include a video review of a hotel that was created by another user.

A user may specify control parameters to narrow or limit the travel information and/or content displayed to the user. Clients 102, 104 may receive the specified control parameters as input from the user and transmit the control parameters to server 108. For example, a user may specify in the control parameters a preferred type of travel information and/or content desired to be received by the user. In some embodiments, a user may specify preferred types of travel information such as point-of-interest and travel destination categories, types of information associated with points-of-interest, curated lists of points-of-interest and travel destinations, etc. For example, a user may be interested in eating lunch, and therefore may specify in the control parameters a "restaurants" point-of-interest category. Accordingly, clients 102, 104 may display travel information such as names, locations, and reviews of restaurants nearby based on the specified control parameters. In some embodiments, a user may specify preferred types of travel content such as video recordings, audio recordings, advertisements, or images and photographs. In still some other embodiments, a user may specify a combination of preferred types of travel information and travel content. For example, the user interested in eating lunch may be interesting in hearing audio recordings of reviews associated with restaurants nearby. Accordingly, the user may specify in the control parameters a "restaurants" point-of-interest category and an "audio recordings" content category.

In some embodiments, the control parameters may include a frequency at which travel information and/or content is desired to be displayed to the user. The frequency may be specified in various forms. For example, the user may specify the frequency in a time interval format. Accordingly, the user may specify that travel information and/or content is to be displayed to the user no more than once every minute, five minutes, 30 minutes, or any other time interval. As another example, the user may specify the frequency in a distance interval format. Accordingly, the user may specify that travel information and/or content is to be displayed to the user no more than once every mile, five miles, 30 miles, or any other distance interval.

In some embodiments, the control parameters may include a maximum number of travel information and/or content notifications to be displayed to the user at one time. For example, the user interested in eating lunch may specify in the control parameters a "restaurants" point-of-interest category and specify a maximum number of ten points-of-interest notifications to be displayed to the user at one time. In some embodiments, the control parameters may indicate a maximum number of notifications to be displayed to the user at one time for a plurality of travel information and/or content types. For example, the control parameters may specify a maximum number of restaurant points-of-interest notifications of eight, a maximum number of outdoor activity points-of-interest notifications of five, and a maximum number of historical information notifications of two. Accordingly, if the user is in an area densely populated by restaurants, limiting the amount of restaurant points-of-interest displayed on client 102 or 104 at one time may prevent the user's view of the restaurant points-of-interest from being obscured by overcrowding of search results.

In some embodiments, the control parameters may include prioritization information for displaying notifications of multiple types of travel information and/or content. For example, the prioritization information may indicate a priority ranking for a plurality of travel information and/or content types. The prioritization information may indicate, for example, that historical information is ranked highest priority, museum points-of-interest are ranked second highest priority, and historical photographs of points-of-interest are ranked third highest priority. Thus, in a non-limiting example, if the control parameters specify a maximum number of travel information and/or content notifications that may be displayed on client 102, 104 at one time is ten, then at least five notifications of historical information, three notifications of museum points-of-interest, and two historical photograph notifications may be displayed according to the prioritization information.

In some embodiments, client 102, 104, or server 108 may determine location information associated with a user. The location information may identify the location of client 102, 104, the user, or any other location that may be associated with the user. If client 102 or 104 determines the location information, they may the transmit location information to server 108. Client 102, 104 may transmit location information to server 108 in any suitable form, such as, for example, geographic coordinates, a bounded box (i.e., a geographic area designated via a rectangle or other shape drawn on a map), a centroid with radius (e.g., a GPS position and desired radius extending from the GPS position), or a street address, as well as any other means that may identify a geographic location of the user or client 102, 104.

In some embodiments, clients 102, 104 may receive other data from a user such as, for example, text, images and photographs, video recordings, audio recordings, webpage addresses, point-of-interest and destination information, or navigation information. For example, clients 102, 104 may receive images or photographs generated by the user, or a list of points-of-interest the user desires to visit while traveling. The other data may also include instructions for displaying the text, images and photographs, video recordings, audio recordings, webpage addresses, point-of-interest and destination information, or navigation information on client 102 or 104. For example, the user may input instructions to client 102 or 104 for automatically playing a video received from the user when client 102 or 104 reaches a specified geographic location. As another example, the user may input instructions to client 102 or 104 for automatically displaying directions to a point-of-interest specified by the user at a predetermined later point in time. Thus, a user who begins traveling in the morning (e.g., at 9:15 a.m.) may input to client 102 or 104 a specified restaurant point-of-interest and instructions for client 102 or 104 to display directions to the restaurant point-of-interest at a specific time later in the day (e.g., 12:30 p.m).

Server 108 may communicate and interact with clients 102, 104 and database 110. For example, server 108 may receive requests, control parameters, and other data from clients 102, 104 through network 106. In some other embodiments, server 108 may implement aspects and features of the present disclosure without the need for accessing another device, component, or network 106. Server 108 may be a general-purpose computer, a mainframe computer, or any combination of these components. In certain embodiments, server 108 may be standalone computing system or apparatus, or it may be part of a subsystem, which may be part of a larger system. For example, server 108 may represent distributed servers that are remotely located and communicate over a communications medium (e.g., network 106) or over a dedicated network, for example, a LAN. Server 108 may be implemented, for example, as a server, a server system comprising a plurality of servers, or a server farm comprising a load balancing system and a plurality of servers.

Sever 108 may store configuration parameters, location information, and other data received from client 102, 104 in database 110. Database 110 may include one or more logically and/or physically separate databases configured to store data. The data stored in database 110 may be received from clients 102, 104 and/or may be provided as input using conventional methods (e.g., data entry, data transfer, data uploading, etc.). The data stored in the database 110 may take or represent various forms including, but not limited to, travel information and/or content as described above, mapping and geographic information, rating and review information, pricing information, days and hours of operation information, news, audio recordings, images and photographs, video recordings, user profile information, configuration parameters, user-created content, and a variety of other electronic data, or any combination thereof. The mapping and geographic information may include, cartographic information, road information, satellite image information, traffic information, maneuver lists, and/or other information about one or more geographical regions of interest. The optimization criteria may include predetermined thresholds, density parameters, reference locations, and/or other information that may be used to provide travel information and/or content based on relevant factors such as distance of a specific route, travel information and/or content density within a particular search region, and/or relative distances of travel information and/or content from a reference location.

In some other embodiments, database 110 may be implemented using a single computer-readable storage medium. In some embodiments, database 110 may be maintained in a network attached storage device, in a storage area network, or combinations thereof, etc. Furthermore, database 110 may be maintained and queried using numerous types of database software and programming languages, for example, SQL, MySQL, IBM DB2®, Microsoft Access®, PERL, C/C++, Java®, etc. Although FIG. 1 shows database 110 associated with server 108, database 110 may be a standalone database that is accessible via network 106 or database 110 may be associated with or provided as part of a system or environment that may be accessible to clients 102, 104 and/or other components. In some embodiments clients 102, 104, and server 108 may download data stored in database 110 and store it locally on client 102, 104, or server 108. Accordingly, clients 102, 104, and server 108 may access the locally stored data without the need to access database 110 or when communication with database 110 via network 106 is unavailable.

Server 108 may generate travel routes, analyze segments of generated routes, and/or provide users with travel information and/or content along a particular route. For example, server 108 may receive current location and destination location information from client 102, 104 and may use the mapping information stored in database 110 to generate the route. Server 108 may receive routing and/or navigation parameters from client 102, 104 specified by the user, and server 108 may generate the route based on the received parameters. For example, the received routing and/or navigation parameters may specify a request for a route with the shortest traveling time or shortest traveling distance. In some embodiments, server 108 may generate one or more alternate routes based on various default parameters and/or parameters specified by the user. For example, server 108 may automatically generate one or more alternate routes based on shortest travel time and/or shortest travel distance, and transmit the alternate routes along with the generated route to client 102, 104 for selection by the user. Server 108 may generate further alternate routes based on user preferences such as avoidance of toll roads, highway roads, bridges, and/or specific towns, states, or countries. In addition to generating travel routes, server 108 may generate other information such as, for example, turn-by-turn directions, route distance and travel time associated with the generated route, and/or instructions to generate audio and/or graphical output as the user traverses through the calculated route. Server 108 may transmit the other information along with the generated routes to clients 102, 104 for display to a user. Server 108 may also store the generated routes and other information in database 110.

In some embodiments, server 108 may calculate areas of interest for identifying travel information and/or content. An area of interest may represent a geographic area on a map. The perimeter of an area of interest may be associated with one or more coordinates on a map and may define the boundary in which server 108 identifies travel information and/or content. An area of interest may include one or more geometric shapes such as, for example, triangles, circles, squares, rectangles, etc. In some embodiments, server 108 may default to a predetermined shape and a user may override the default shape by specifying the shape to be used. In some embodiments, server 108 and/or the user may specify a plurality of shapes for calculating areas of interest. For example, different shapes may be used for calculating areas of interest when the user is driving, walking, using public transportation, traveling in or through a city, traveling between cities, etc. Thus, a user traveling in a city may be willing to travel in various directions from the user's current location, and therefore may desire to receive notifications of travel information and/or content within a radial area around the user. In contrast, a user traveling along a highway between cities may be less willing to make significant deviations from the user's route, and therefore may desire to receive notifications of travel information and/or content within a rectangular or triangular area along the user's route.

In some embodiments, server 108 may calculate an area of interest based on the location information received from clients 102, 104 and a relative distance of travel. For example, the current location of the user may be used as the center point of a circular (or radial) area of interest, and server 108 may calculate the perimeter of the area of interest around the user's current location. As another example, the current location of the user may be located on the perimeter of an area of interest. Accordingly, a circular (or radial) area of interest maybe calculated so that the diameter of the circle projects in a direction away from the user's location. Similarly, a triangular area of interest may be calculated using the user's location as a vertex of the triangle, and the area of interest may project in a direction away from the user's location.

The relative distance of travel may be a distance relative to, for example, the user's current location, an origination or destination location along a route, or any other reference from a geographic point (e.g., landmarks, points-of-interest, highway exits, rest stops, etc.). Various factors may be used in order to determine the relative distance of travel. For example, client 102 or 104, or server 108 may determine a velocity at which the user is traveling. If client 102 or 104 determines the velocity, then client 102 or 104 may transmit the velocity information to server 108 for use in determining the relative distance of travel. In some embodiments, the greater the velocity at which the user is traveling, the greater the relative distance of travel will be. For example, server 108 may calculate the relative distance of travel as directly proportional to the velocity at which the user is traveling. Thus, the relative distance of travel will increase or decrease uniformly with increases or decreases in the user's velocity of travel. As another example, the relative distance of travel may increase or decrease exponentially as the user's velocity of travel increases or decreases. In a further example, the relative distance of travel may increase or decrease logarithmically as the user's velocity of travel increases or decreases. In still further embodiments, a combination of proportional and exponential, and logarithmic calculations can be used to determine the relative distance of travel. For example, server 108 may use a threshold velocity (determined, for example, by the user, server 108, or a predetermined value) at which a transition between proportional and exponential calculations occurs. Thus, the relative distance of travel may be calculated proportionally as the user travels at a velocity lower than the velocity threshold, and the relative distance of travel may be calculated logarithmically once the user's velocity exceeds the velocity threshold.

In some embodiments, a user may specify the relative distance of travel as input to client 102 or 104. In such cases, client 102 or 104 may transmit the specified distance to server 108 for use in calculating the area of interest. The user may specify the relative distance of travel in, for example, miles or kilometers, fractions of miles or kilometers, or some combination thereof. In some embodiments, the user may specify a plurality of relative distances. For example, the user may specify unique relative distances when the user is driving, walking, using public transportation, traveling in or through a city, traveling between cities, etc.

In some embodiments, a reference point may be identified based on the relative distance of travel from the user's location. The reference point may be located along the user's route of travel, a location off of the route of travel, or at a location specified by the user. For example, server 108 may determine a reference point located along the user's route based on the relative distance of travel. In one embodiment, server 108 may determine the location of the reference point based on or using a straight-line method. For example, if the relative distance of travel is 30 miles, server 108 may determine the reference point on the route at a location that is at a 30 mile straight line from the user's location. In another embodiment, server 108 may determine the location of the reference point based on a traveling distance from the user's location. Thus, server 108 may determine the reference point on the route at a location that will take the user 30 miles to travel from the user's location based on the user's current route. Similar methods may be used when the reference point is off the route of travel or specified by the user.

Server 108 may use the user's location and the reference point to calculate the perimeter of the area of interest. In some embodiments, where the area of interest includes a circular or radial area, server 108 may use the user's location and the reference point to calculate the perimeter of the area of interest as the circumference of the circle. For example, when the user's location is used as the center point of a circular area of interest, the distance between the user's location and the reference point (i.e., the relative distance of travel) may be used as the radius of the circular area of interest, and the radius may be used to calculate the circumference. As another example, when the user's location is at the perimeter of the circular area of interest, the distance between the user's location and the reference point (i.e., the relative distance of travel) may be used as the diameter of the circular area of interest, and the diameter may be used to calculate the circumference. As disclosed above, the user may specify the relative distance of travel as input to client 102 or 104. When the user's location is used as the center point of a circular area of interest, the user input may specify the relative distance of travel as a maximum radial travel distance from the user's location. For example, the user input may specify that the user desires to receive travel information and/or content not more than one mile from the user's current location.

In some embodiments, where the area of interest includes a triangular area, server 108 may use the user's location and the reference point to calculate the perimeter of the triangular area of interest. For example, server 108 may use the user's location as a vertex of the triangle and the reference point as a location along the base of the triangle. In some embodiments, the reference point may be located at a point that bisects the base into two equal lengths. In some other embodiments, the reference point may be located at any other location along the base. When the reference point is located at a point that bisects the base, the distance between the user's location and the reference point (i.e., the relative distance of travel) thus defines the height of the triangle. The length of the base may be determined as a default length or a length that is specified by the user as input to clients 102, 104. Moreover, the length of the base may be determined based on the user's input. For example, the user input may specify that the user desires to receive travel information and/or content not more than a specified distance from the user's route. Accordingly, when the reference point is located along the user's route at a point that bisects the base of the triangle, each equal length of the base may extend in a direction normal to the route at a distance equal to the distance specified by the user input. As an example, if the user input specifies that the user desires to receive travel information and/or content not more than five miles from the user's route, the length of the base may be determined as ten miles (i.e., five miles in each direction normal to the user's route). In some embodiments, server 108 may use a default length for the base that can be overridden by the user's specified length.

Server 108 may use the length of the triangle's base and the triangle's height (i.e., the relative distance of travel) to calculate the remaining sides of the triangular area of interest. For example, if the triangular area of interest is an isosceles triangle, the length of the remaining sides may be determined as $$a = \sqrt{h^2 + \frac{1}{4}b^2}$$

where a may be the length of the remaining sides, h may be the triangle's height (i.e., the relative distance of travel), and b may be the length of the triangle's base. In other embodiments, other types of triangular areas of interest may be used, for example, scalene, equilateral, or right triangles.

In some embodiments, server 108 may search one or more databases to identify travel information and/or content within an area of interest. For example, server 108 may search for travel information and/or content stored in one or more databases 110. The travel information and/or content stored in one or more databases 110 may be associated with coordinates on a map, such as coordinates located within the area of interest. In some embodiments, server 108 may search one or more databases 110 for travel information and/or content based on default parameters. In some other embodiments, server 108 may search one or more databases 110 for travel information and/or content based on control parameters specified by the user as described above. For example, the control parameters may specify that only historical landmarks are to be displayed to the user. Accordingly, server 108 may search one or more databases 110 for travel information and/or content associated with historical landmarks that are located within the area of interest.

In some embodiments, server 108 may search one or more databases 110 for advertisements associated with travel information and/or content identified within the area of interest. For example, server 108 may have identified a department store within the area of interest. Server 108 may search one or more databases 110 for advertisements such as promotions, coupons, sale information, product information, etc., associated with the identified department store.

Server 108 may transmit the identified travel information and/or content to clients, 102, 104. Moreover, server 108 may transmit instructions to electronically display the identified travel information and/or content on clients 102, 104. Alternatively, clients 102, 104 may provide instructions for electronically displaying the identified travel information and/or content on clients 102, 104, respectively. The instructions may include, for example, instructions for displaying notifications of the identified travel information and/or content on clients 102, 104. A notification may include a visual indicator on the display screen of clients 102, 104, an audio notification played through a speaker of client 102 or 104, a text or email notification, or any combination thereof. In some embodiments, visual notifications may be displayed on an electronic map display of client 102 or 104. For example, clients 102 or 104 may display a map marker at or near a location associated with the travel information and/or content. In some other embodiments, visual notifications may be displayed on a home screen or a user profile of the user.

In some embodiments, the user may interact with the notification by selecting input (e.g., pressing an area of a touch screen or a physical button) associated with the notification. Interacting with the notification may enable display of the travel information and/or content associated with the notification. For example, displaying the travel information and/or content may include opening a new window on the display of client 102 or 104, or opening a sub-window on the electronic mapping display. As another example, displaying the travel information and/or content may include opening an audio or video player on client 102 or 104 for displaying recorded audio or video content to the user. As a further example, display the travel information and/or content may include opening a web browser and navigating to a webpage that displays the travel information and/or content.

In some embodiments the instructions may include instructions for automatically displaying the identified travel information and/or content. For example, the instructions may instruct client 102 or 104 to display the identified travel information and/or content when the user reaches a specified location. The specified location may include geographic coordinates, a bounded box (i.e., a geographic area designated via a rectangle or other shape drawn on a map), a centroid with radius (e.g., a GPS position and desired radius extending from the GPS position), or a street address. In some embodiments, the instructions for automatically displaying the identified travel information and/or content may specify a duration of time for which the identified travel information and/or content is to be displayed to the user. For example, the instructions may specify that the identified travel information and/or content may remain displayed to the user for 30 seconds, one minute, five minutes, or any other time duration. In some embodiments, the instructions may specify that the identified travel information and/or content may be displayed to the user until an event occurs. For example, if the travel information and/or content is a video review of a nearby restaurant, the instructions may specify that the video review may remain displayed to the user until the video review has finished playing.

Figure 2:
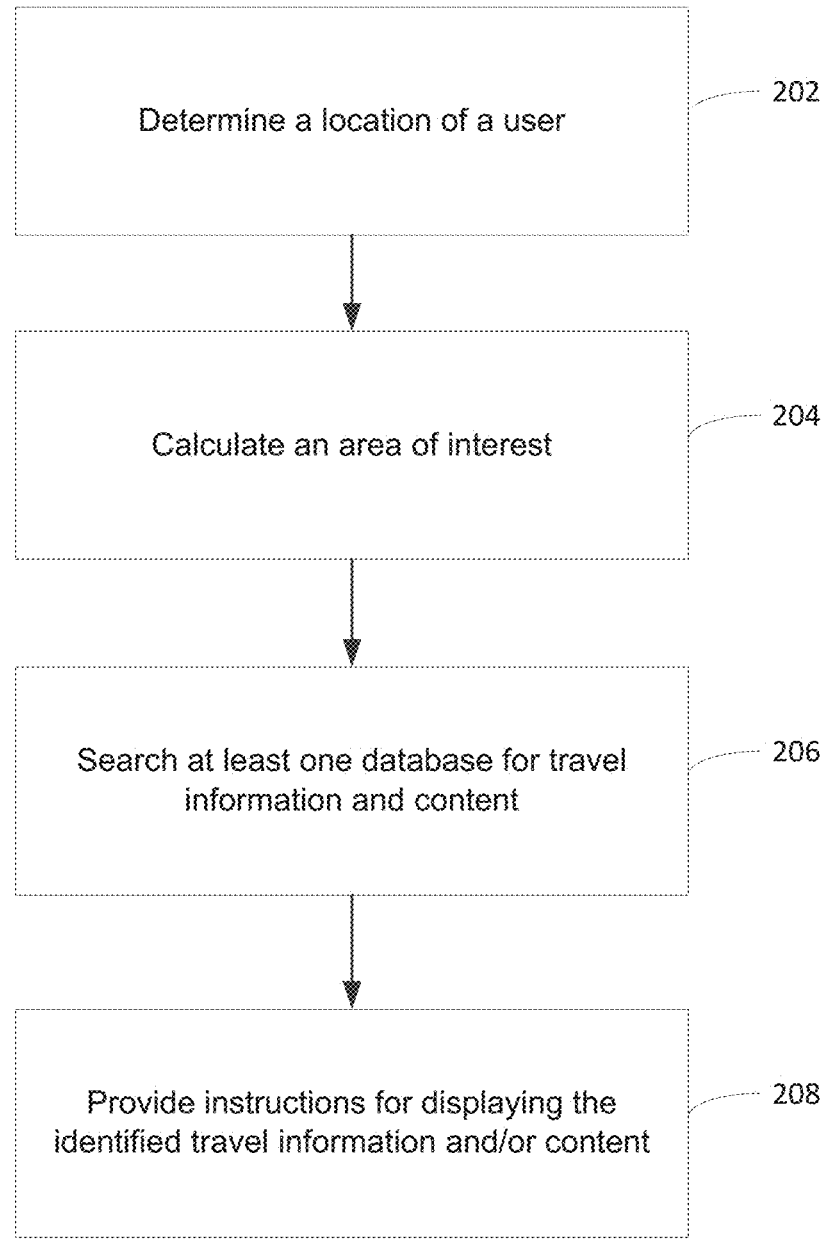
FIG. 2 is a flow diagram depicting example steps of a process for providing travel information and/or content, in accordance with an embodiment of the present disclosure.

FIG. 2 depicts a flowchart of an example method 200, consistent with some embodiments and aspects of the present disclosure. Method 200 may be implemented, for example, for providing travel information and/or content to a user. In some embodiments, method 200 may be implemented as one or more computer programs executed by one or more processors. Moreover, in some embodiments, method 200 may be implemented by a server (e.g., server 108 having one or more processors executing one or more computer programs stored on a non-transitory computer readable medium) or a user device (e.g., device 102, 104 having one or more processors executing one or more computer programs stored on a non-transitory computer readable medium). In some embodiments, method 200 may be implemented by a combination of a server and a client.

In some embodiments, example method 200 may include determining a location of a user or a user device associated with the user at 202. For example, the user device and/or the server may determine the location of the user using a GPS system or other positioning systems. Further, in some embodiments, the location of the user may be determined using beacon or other transmitted signals, and/or triangulation techniques. The user's location may be expressed in any form of location information, for example, geographic coordinates, geographic area on a map, street address, as well as any other means that may identify a geographic location of the user.

In some embodiments, example method 200 may include calculating an area of interest at 204. The area of interest may be calculated as described above in reference to FIG. 1. For example, the area of interest may be calculated based on the determined location data (e.g., location of the user and/or user device). Moreover, the area of interest may be calculated based on a relative distance of travel. In some embodiments, the area of interest may include a geometric area. The geometric area may be any geometric shape, for example, a triangle, circle, square, rectangle, etc. In some embodiments, the area of interest may be associated with one or more coordinates on an electronic map. For example, a square-shaped area of interest may be associated with four sets of coordinates; each set corresponding to one of the corners of the square. As another example, a triangular area of interest may be associated with three sets of coordinates; each set corresponding to one of the vertices of the triangle.

In some embodiments, example method 200 may include searching one or more databases for travel information and/or content at 206. For example, the user device and/or server may identify travel information and/or content within the area of interest that is stored in one or more databases (e.g., database 110). In some embodiments, travel information and/or content may be determined to be within the area of interest based on geographic coordinates associated with the travel information and/or content. For example, the user device and/or server may compare a set of geographic coordinates associated with the travel information and/or content to geographic coordinates associated with the area of interest. The travel information and/or content may be determined to be within the area of interest if the geographic coordinates associated with the travel information and/or content are within the perimeter defined by the geographic coordinates of the area of interest. In some embodiments, travel information and/or content may be determined to be within the area of interest based an address associated with the travel information and/or content. For example, the user device and/or server may compare the address associated with the travel information and/or content to the geographic coordinates associated with the area of interest. The travel information and/or content may be determined to be within the area of interest if the address associated with the travel information and/or content is within the perimeter defined by the geographic coordinates of the area of interest.

In some embodiments, example method 200 may include providing instructions for displaying the travel information and/or content at 208. For example the user device and/or server may provide instructions to electronically display the identified travel information and/or content on a user device as described above in reference to FIG. 1.

In some embodiments, step 204 may be repeated in order to determine a second area of interest. The second area of interest may be located within the first area of interest, outside the first area of interest, or partially within the first area of interest. The second area of interest may include an area shape that is different from the area shape of the first area of interest. For example, if the first area of interest includes a triangular area of interest, the second area of interest may include a circular or radial area of interest. However, the first and second area of interest may include the same area shape. The one or more databases searched at step 206 may be searched in order to identify travel information and/or content only within the second area of interest. Thus, a user that desires to explore only a portion of the first area of interest more thoroughly may use the second area of interest to narrow the search results to a smaller geographic area.

In some embodiments, example method 200 may be automatically repeated by the server and/or the user device. At periods in time subsequent to step 208, example method 200 may be automatically repeated in order to electronically display further identified travel information and/or content to the user as the user travels along the route. For example, the user device and/or the sever may determine an updated location of the user. A new area of interest may be calculated based on the updated location. The one or more databases may be searched again to identify travel information and/or content within the new area of interest, and the identified travel information and/or content may be presented to the user. In some embodiments default parameters may specify the frequency at which example method 200 may be repeated by the user device and/or the server. In some other embodiments, the user may specify the frequency (e.g., by input to the user device).

Figure 3A:
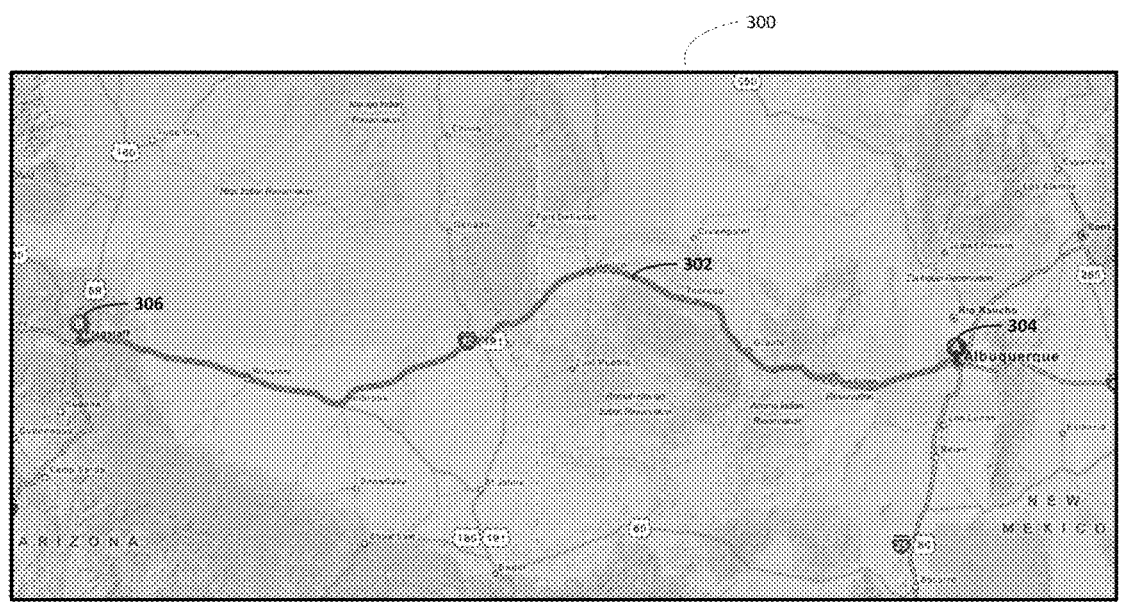
FIG. 3A-3C illustrate an example implementation of calculating areas of interest, in accordance with an embodiment of the present disclosure.
Figure 3B:
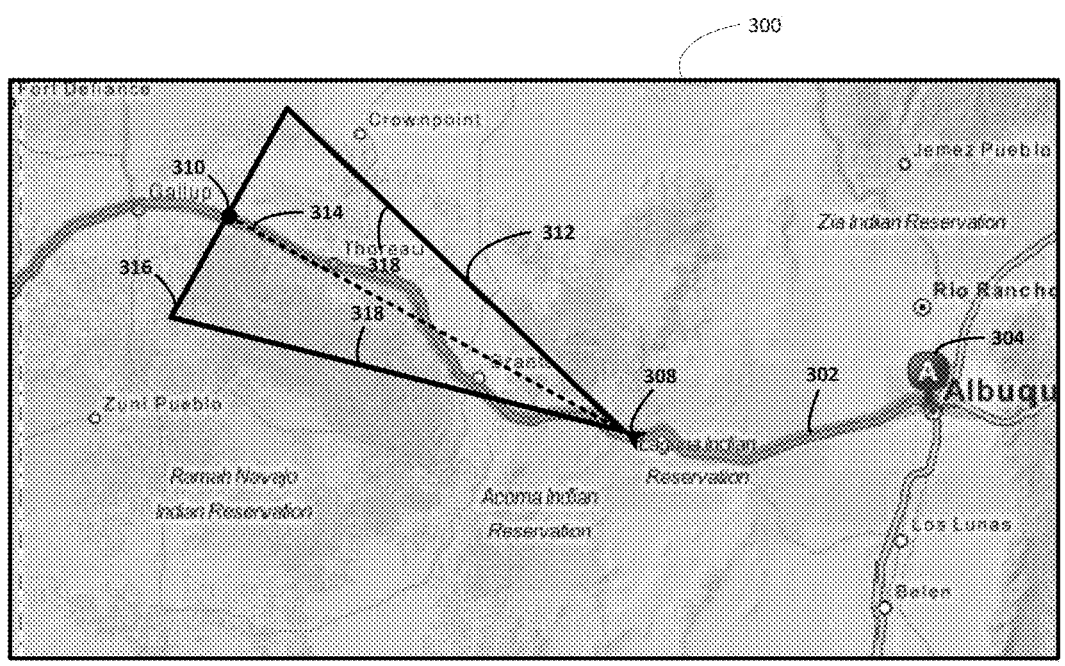
Figure 3C:
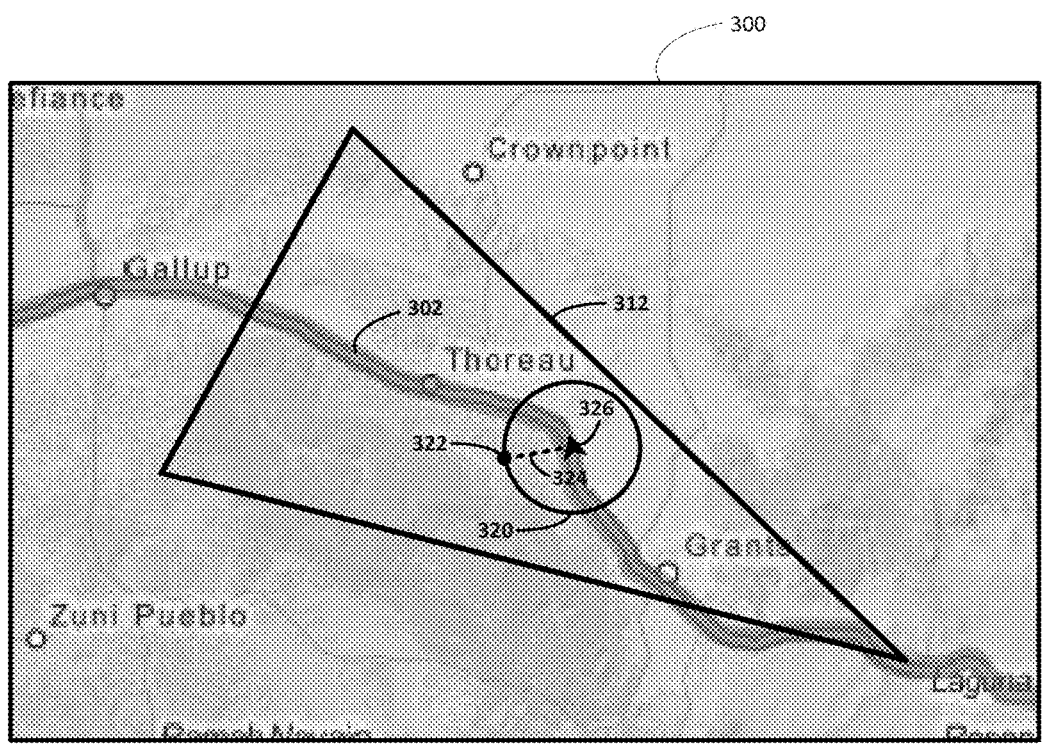

FIGS. 3A-3C depict an example implementation of calculating areas of interest, according to some embodiments of the present disclosure. As shown in FIG. 3A, an electronic map 300 may include a travel route 302. Route 302 may be calculated based on, for example, a driving (i.e., by car) mode of travel, and may include an origination location 204 of Albuquerque, N. Mex., and a destination location 306 of Flagstaff, Ariz. Route 302 may be calculated as described above in reference to FIG. 1.

Areas of interest may be calculated at any point along route 302. For example, as shown in FIG. 3B, an area of interest 312 may be calculated based on a user location 308 along route 302. A relative distance of travel 314 may be calculated from user location 308. User location 308 and distance 314 may be determined as described above in reference to FIGS. 1 and 2. A reference point 310 may be determined based on distance 314 as described above in reference to FIGS. 1 and 2. As shown in FIG. 3B, reference point 310 may be located at a point along route 302. In the example shown in FIG. 3B, area of interest 312 includes a triangular area of interest. More specifically, area of interest 312 includes an isosceles triangular area of interest. The perimeter of area of interest 312 may be defined by base 316 and sides 318. As described above in reference to FIGS. 1 and 2, the length of base 316 may be a default parameter set by a server (e.g., server 108), or may be specified by a user. The length of sides 318 may be calculated based on the length of base 316 and distance 314 as described above in reference to FIGS. 1 and 2.

A second area of interest may be calculated on electronic map 300. For example, as shown in FIG. 3C, a second area of interest 320 may be calculated within area of interest 312. However, second area of interest 320, or other areas of interest may be calculated outside of area of interest 312 or partially within area of interest 312. Second area of interest 320 may be calculated based on an updated user location 326 along route 302. A relative distance of travel 324 may be calculated from updated user location 326. Updated user location 326 and distance 324 may be determined as described above in reference to FIGS. 1 and 2. A reference point 322 may be determined based on distance 324 as described above in reference to FIGS. 1 and 2. As shown in FIG. 3C, reference point 322 may be located at a point off of route 302. In the example shown in FIG. 3C, area of interest 320 includes a circular (or radial) area of interest. The circumference of the circular area of interest may define the perimeter of area of interest 320. Distance 324 may define the radius of area of interest 320. The perimeter area of interest 320 may be calculated based on the radius (i.e., distance 324) as described above in reference to FIGS. 1 and 2.

Figure 4A:
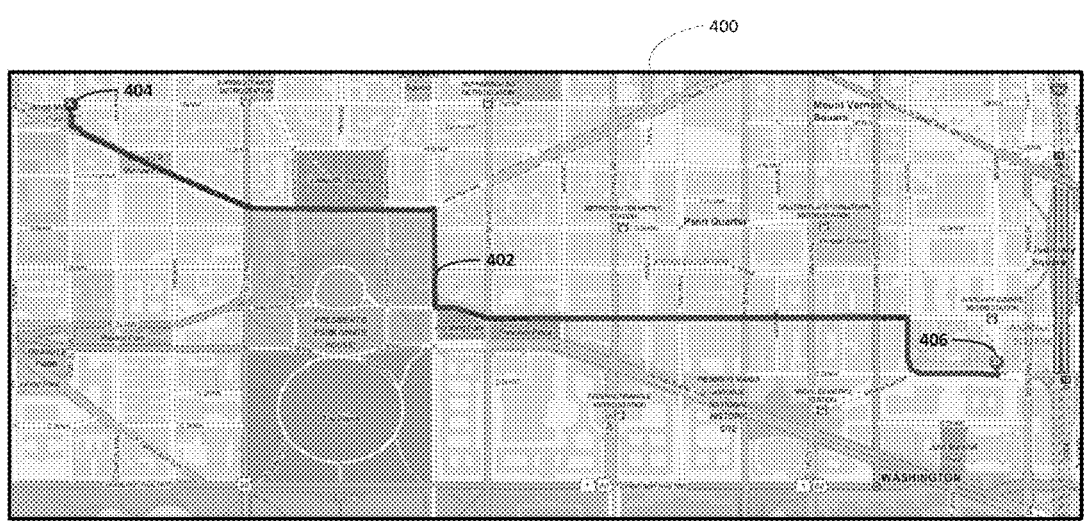
FIGS. 4A and 4B illustrate another example implementation of calculating areas of interest, in accordance with an embodiment of the present disclosure.
Figure 4B:
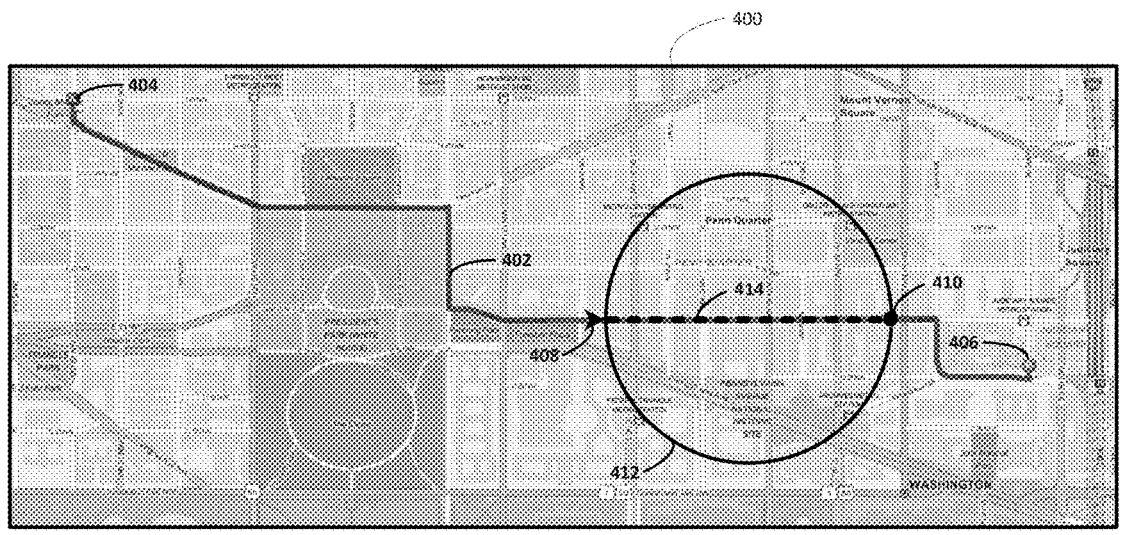

FIGS. 4A and 4B depict another example implementation of calculating areas of interest, according to some embodiments of the present disclosure. As shown in FIG. 4A, an electronic map 400 may include a travel route 402. Route 402 may be calculated based on, for example, a walking mode of travel, and may include an origination location 404 of James Monroe Park, Washington, D.C., and a destination location 406 of Judiciary Square, Washington, D.C. Route 402 may be calculated as described above in reference to FIG. 1.

Areas of interest may be calculated at any point along route 402. For example, as shown in FIG. 4B, an area of interest 412 may be calculated based on a user location 408 along route 402. A relative distance of travel 414 may be calculated from user location 408. User location 408 and distance 414 may be determined as described above in reference to FIGS. 1 and 2. A reference point 410 may be determined based on distance 414 as described above in reference to FIGS. 1 and 2. As shown in FIG. 4B, reference point 410 may be located at a point along route 402. In the example shown in FIG. 4B, area of interest 412 includes a circular (or radial) area of interest. The circumference of the circular area of interest may define the perimeter of area of interest 412. Distance 414 may define the diameter of area of interest 412. The perimeter of area of interest 412 may be calculated based on the diameter (i.e., distance 414) as described above in reference to FIGS. 1 and 2.

Figure 5:
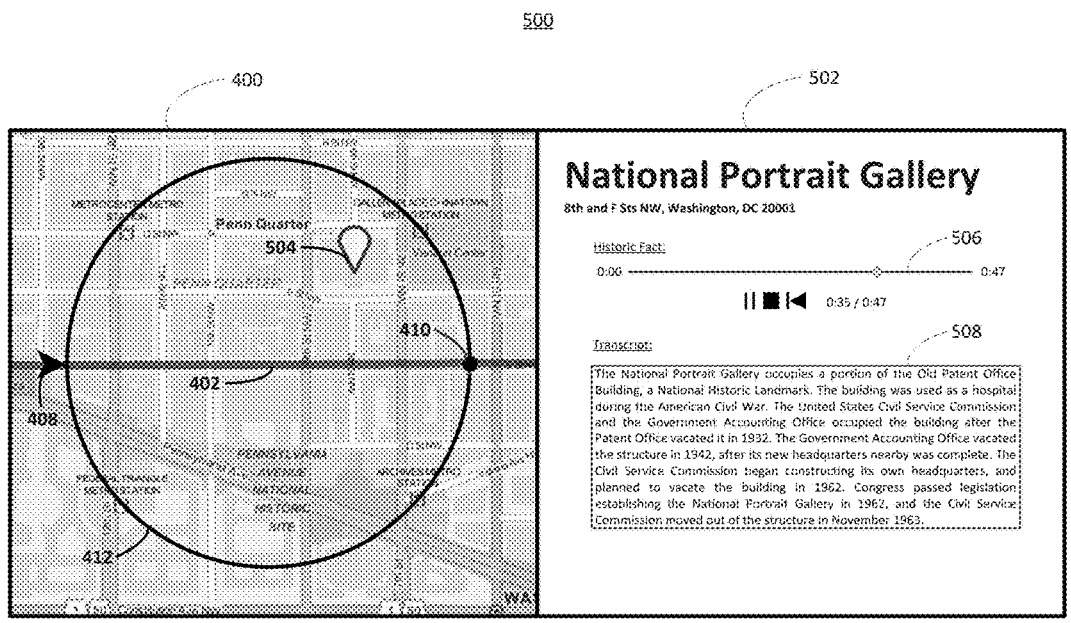
FIG. 5 illustrates an example display of travel information and/or content in accordance with an embodiment of the present disclosure.

FIG. 5 illustrates an example of travel information and/or content displayed on a device 500, in accordance with an embodiment of the present disclosure. In some embodiments, device 500 may be implemented by clients 102, 104, and/or system 110. As shown in the example in FIG. 5, a notification 504 associated with travel information and/or content may be shown on electronic map 400. The travel information and/or content may be associated with a point-of-interest, for example, a National Portrait Gallery. Notification 504 may be displayed in proximity to the point-of-interest on electronic map 400. In some embodiments, notification 504 may include an identifier that indicates a type of travel information and/or content associated with notification 504. For example, notification 504 may include a video camera icon that indicates a video recording type of travel content. As another example, notification 504 may include a pocket watch icon that indicates a historical fact type of travel information. In some embodiments, notification 504 may include a plurality of identifiers that indicate a plurality of types of travel information and/or content associated with notification 504. For example, notification 504 may include a pocket watch icon and a loudspeaker icon that indicate a historical fact and an audio recording type of travel information and/or content associated with notification 504.

In some embodiments, a window 502 may be displayed on device 500 responsive to an input received for selecting notification 504 (e.g., input from a user touching a portion of a touchscreen of a client device that is associated with notification 504). Window 502 may display the travel information and/or content associated with notification 504. In the example shown in FIG. 5, a historical fact and audio recording is associated with notification 504. Accordingly, window 502 may include audio recording 506 and historical fact 508. In the example, audio recording 506 includes an audio recording of historical fact 508. In some embodiments, audio recording 506 may automatically begin playing responsive to the input received for selecting notification 504. In some other embodiments, the user may use one or more control inputs displayed within window 502 to play audio recording 506.

Embodiments described above include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 6:
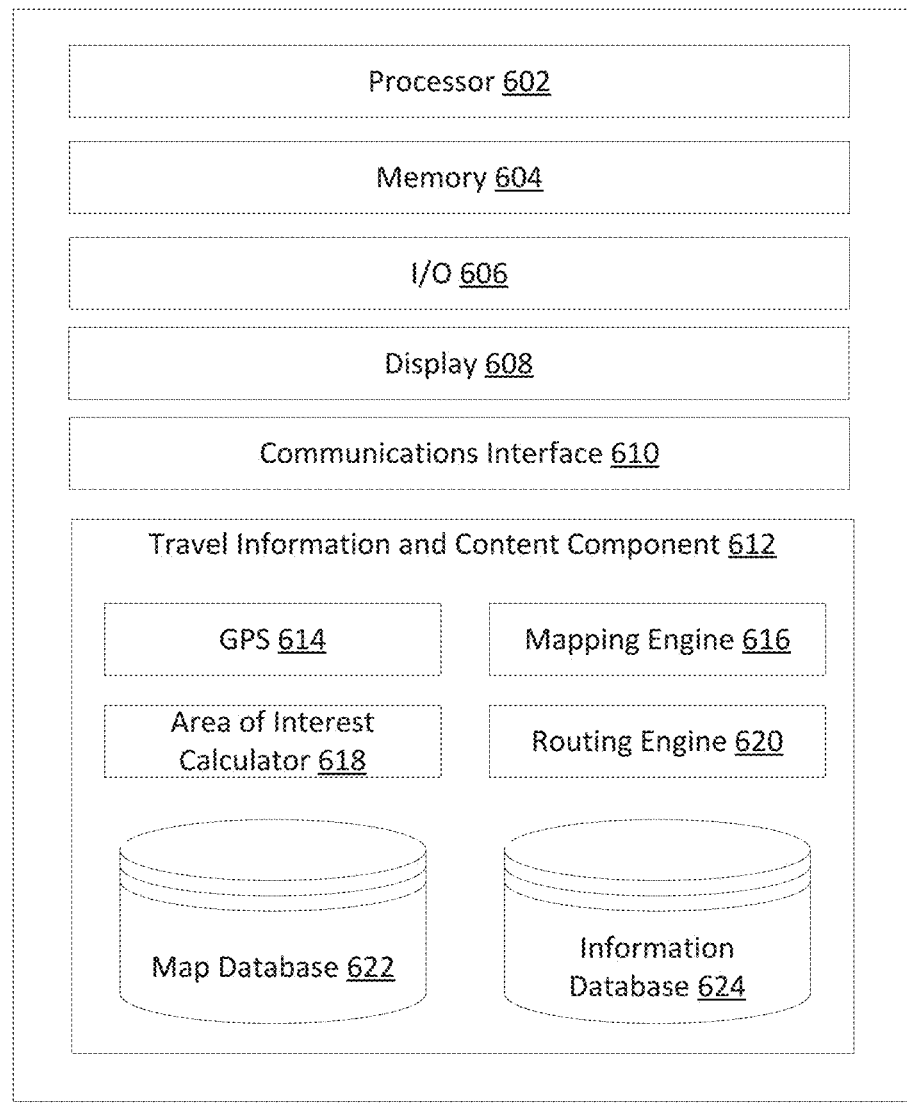
FIG. 6 illustrates an example electronic apparatus for implementing some embodiments and aspects of the present disclosure.

FIG. 6 illustrates an example apparatus or system 600 for implementing embodiments and aspects of the present disclosure described above. By way of example, apparatus or system 600 may be used to implement clients 102, 104, server 108, and/or database 110 of FIG. 1. The arrangement and number of components in system 600 is provided for purposes of illustration. Additional arrangements, number of components, and other modifications may be made, consistent with the present disclosure.

As shown in FIG. 6, system 600 may include one or more processors 602 for executing instructions. Processors suitable for the execution of instructions include, by way of example, both general and special purpose microprocessors, and any one or more processors of any kind of digital computer. System 600 may also include one or more input/output (I/O) devices 606. By way of example, I/O devices 606 may include physical keyboards, virtual touch-screen keyboards, mice, joysticks, styluses, etc. Moreover, I/O devices 606 may include loudspeakers, handset speakers, microphones, cameras, or sensors such as accelerometers, temperature sensors, or photo/light sensors.

As further illustrated in FIG. 6, system 600 may include one or more storage devices configured to store data and/or software instructions used by the one or more processors 602 to perform operations consistent with disclosed aspects. For example, system 600 may include a memory 604 configured to store one or more software programs that performs functions or operations when executed by the one or more processors 602. By way of example, memory 604 may include NOR or NAND flash memory devices, Read Only Memory (ROM) devices, Random Access Memory (RAM) devices, etc. Memory 604 may also include storage mediums such as, for example, hard drives, solid state drives, tape drives, RAID arrays, etc. Although FIG. 6 shows only one memory 604, system 600 may include any number of memories 604. Further, although FIG. 6 shows memory 604 as part of system 600, memory 604 may be located remotely and system 600 may be able to access memory 604 via network 106.

System 600 may also include one or more displays 608 for displaying data and information. For example display 608 may be configured to display electronic maps, navigation and location information, and travel information and/or content. Display 608 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

System 600 may also include one or more communications interfaces 610. Communications interface 610 may allow software and data to be transferred between system 600, network 106, clients 102, 104, server 108, database 110, and/or other components. Examples of communications interface 610 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 610 may transfer software and data in the form of signals, which may be electronic, electromagnetic, optical, or other signals capable of being received by communications interface 610. These signals may be provided to communications interface 260 via a communications path (not shown), which may be implemented using wireless, wire, cable, fiber optics, radio frequency ("RF") link, and/or other communications channels.

System 600 may include travel information and content component 612. For example travel information and content component 612 may be configured to provide travel information and/or content in accordance with the preceding disclosure. In some embodiments, travel information and content component 612 may include a GPS component 614, a mapping engine 616, an area of interest calculator 618, a routing engine 620, a map database 622, and an information database 624. Components 614, 616, 618, 620, 622, and 624 may be implemented as hardware modules configured to execute the functions described herein. Alternatively, processor 602 may be configured to execute the functions of components 614, 616, 618, 620, 622, and 624. For example, processor 602 may communicate with memory 606 that includes components 614, 616, 618, 620, 622, and 624 in the form of computer-executable instructions, such that processor 602 may then execute these instructions. As another example, the functions of components 614, 616, 618, 620, 622, and 624 may be included in processor 602 itself, such that processor 602 is configured to implement these functions.

GPS 614 may determine location information associated with a user. The location information may identify the location of system 600 and/or the user, or any other location that the user may specify. The location information may include, for example, global positioning system (GPS) coordinates, a bounded box (i.e., a geographic area designated via a rectangle or other shape drawn on a map), a centroid with radius (e.g., a GPS position and desired radius extending from the GPS position), or a street address, as well as any other means that may identify a geographic location of the user or device 600.

Mapping engine 616 may include one or more electronic mapping applications configured to render map displayed based on stored map data and user input. The generated electronic maps may be displayed to a user on display 608. Mapping database 622 may be used to implement some of the functions of database 110. For example, mapping database 622 may store mapping and geographic information including, but not limited to, cartographic information, road information, satellite image information, traffic information, maneuver lists, and/or other information about one or more geographical regions of interest.

Routing engine 620 may generate routes, perform analysis on segments of generated routes, and/or provide a user with information corresponding to points-of-interest and landmarks along a route. For example, routing engine 620 may request mapping engine 616 to provide relevant information from mapping database 622 to generate a particular route. Alternatively, or additionally, routing engine 620 may retrieve the relevant information directly from mapping database 622.

Information database 624 may be used to implement some of the functions of database 110. For example, information database 624 may store travel information and/or content as well as other content described above in reference to FIG. 1. Information database 624 may further store the control parameters received from clients 102, 104, and/or server 108.

Area of interest calculator 618 may calculate areas of interest in accordance with the various embodiments and aspects of the present disclosure. For example, area of interest calculator 618 may calculate areas of interest in accordance with the embodiments and techniques described herein. In some embodiments, mapping engine 616 may identify and retrieve travel information and/or content within a calculated area of interest from information database 624. Mapping engine 616 may transmit the identified travel information and/or content to display 608 for display to a user.

The disclosed embodiments are not limited to separate programs or computers configured to perform dedicated tasks. For example, server 108 may include memory 604 that stores a single program or multiple programs. Additionally, server 108 may execute one or more programs located remotely from server 108. In some example embodiments, server 108 may be capable of accessing separate web server(s) or computing devices that generate, maintain, and provide web sites and/or event creation and notification services. Clients 102, 104 may function in a manner similar to server 104 and vice-versa.

In the preceding specification, various exemplary embodiments and features have been described with reference to the accompanying drawings. It will, however, be evident that various modifications and changes may be made thereto, and additional embodiments and features may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Moreover, while embodiments of the present disclosure have been described with reference to the processing of point-of-interest data, embodiments of the present disclosure may be applied to process and ingest other types of data. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented method for providing travel information and/or content to a user, the computer-implemented method comprising operations performed by one or more processors comprising:
   determining a location of a user traveling along a route and a velocity of travel of the user;
   calculating a relative distance of travel based on the determined velocity, wherein the relative distance of travel is calculated proportionally to the determined velocity when the determined velocity is below a threshold, and the relative distance of travel is calculated logarithmically to the determined velocity when the determined velocity is above the threshold;
   calculating an area of interest based on the location of the user and the relative distance of travel, the area of interest being associated with coordinates on a map and including a triangular area defined by an isosceles triangle, wherein the location of the user defines a vertex of the isosceles triangle and the relative distance of travel defines a point along a base of the isosceles triangle, the point bisecting the base of the isosceles triangle;
   searching at least one database to identify the travel information and/or content within the area of interest, the travel information and/or content being stored in the database and associated with the coordinates on the map;
   providing, at a first point in time, instructions to electronically display the identified travel information and/or content on a device of the user; and
   automatically repeating, at subsequent points in time, the operations in order to electronically display further identified travel information and/or content to the user as the user travels along the route.

2. The computer-implemented method of claim 1, further comprising:
   determining a mode of travel of the user, and
   wherein calculating the area of interest comprises:
      calculating the area of interest based on the determined mode of travel of the user.

3. The computer-implemented method of claim 2, wherein the determined mode of travel is at least one of by foot, car, or public transit.

4. The computer-implemented method of claim 1, further comprising:
   determining the relative distance of travel based on data provided by the user.

5. A computer-implemented method for providing travel information and/or content to a user, the computer-implemented method comprising operations performed by one or more processors comprising:
   determining a location of a user traveling along a route and a velocity of travel of the user;
   calculating a relative distance of travel based on the determined velocity, wherein the relative distance of travel is calculated proportionally to the determined velocity when the determined velocity is below a threshold, and the relative distance of travel is calculated logarithmically to the determined velocity when the determined velocity is above the threshold;
   calculating an area of interest based on the location of the user and the relative distance of travel, the area of interest being associated with coordinates on a map and including a radial area defined by a circle, wherein the relative distance of travel defines a radius of the circle;
   searching at least one database to identify the travel information and/or content within the area of interest, the travel information and/or content being stored in the database and associated with coordinates on the map;
   providing, at a first point in time, instructions to electronically display the identified travel information and/or content on a device of the user; and
   automatically repeating, at subsequent points in time, the operations in order to electronically display further identified travel information and/or content to the user as the user travels along the route.

6. The computer-implemented method of claim 1, wherein the travel information and/or content comprises information associated with one or more points-of-interest.

7. The computer-implemented method of claim 1, further comprising:
   receiving, from the user, control parameters for presenting travel information and/or content,
      the control parameters controlling at least one of a type or frequency of travel information and/or content presented for display to the user,
         wherein providing the instructions to electronically display the identified travel information and/or content on the device of the user is performed in accordance with the control parameters received from the user.

8. A system for providing travel information and/or content to a user, the system comprising:
   a memory that stores a set of instructions; and
   at least one processor in communication with the memory and configured by the set of instructions to:
   determine a location of a user traveling along a route and a velocity of travel of the user;
   calculate a relative distance of travel based on the determined velocity,
      wherein the relative distance of travel is calculated proportionally to the determined velocity when the determined velocity is below a threshold, and the relative distance of travel is calculated logarithmically to the determined velocity when the determined velocity is above the threshold;
   calculate an area of interest based on the location of the user and the relative distance of travel,
      the area of interest being associated with coordinates on a map and including a triangular area defined by an isosceles triangle,
         wherein the location of the user defines a vertex of the isosceles triangle and the relative distance of travel defines a point along a base of the isosceles triangle,
         the point bisecting the base of the isosceles triangle;
   search at least one database to identify the travel information and/or content within the area of interest,
      the travel information and/or content being stored in the database and associated with coordinates on the map;
   provide, at a first point in time, instructions to electronically display the identified travel information and/or content on a device of the user; and
   automatically repeat, at subsequent points in time, the determining the location, the calculating the relative distance of travel, the calculating the area of interest, the searching the at least one database, and the providing the instructions in order to electronically display further identified travel information and/or content to the user as the user travels along the route.

9. The system of claim 8, wherein the at least one processor is configured by the set of instructions:
to: determine a mode of travel of the user, and
wherein calculating the area of interest comprises:
calculating the area of interest based on the determined mode of travel of the user.

10. The system of claim 9, wherein the determined mode of travel is at least one of by foot, car, or public transit.

11. The system of claim 8, wherein the at least one processor is configured by the set of instructions to:
determine the relative distance of travel based on data provided by the user.

12. A system for providing travel information and/or content to a user, the system comprising:
a memory that stores a set of instructions; and
at least one processor in communication with the memory and configured by the set of instructions to:
determine a location of a user traveling along a route and a velocity of travel of the user;
calculate a relative distance of travel based on the determined velocity, wherein the relative distance of travel is calculated proportionally to the determined velocity when the determined velocity is below a threshold, and the relative distance of travel is calculated logarithmically to the determined velocity when the determined velocity is above the threshold;
calculate an area of interest based on the location of the user and the relative distance of travel,
the area of interest being associated with coordinates on a map and including a radial area defined by a circle, wherein the relative distance of travel defines a radius of the circle;
search at least one database to identify the travel information and/or content within the area of interest,
the travel information and/or content being stored in the database and associated with coordinates on the map;
provide, at a first point in time, instructions to electronically display the identified travel information and/or content on a device of the user; and
automatically repeat, at subsequent points in time, the determining the location, the calculating the relative distance of travel, the calculating the area of interest, the searching the at least one database, and the providing the instructions order to electronically display further identified travel information and/or content to the user as the user travels along the route.

13. The system of claim 8, wherein the travel information and/or content comprises information associated with one or more points-of-interest.

14. The system of claim 8, wherein the at least one processor is configured by the set of instructions to:
receive, from the user, control parameters for presenting travel information and/or content,
the control parameters controlling at least one of a type or frequency of travel information and/or content presented for display to the user,
wherein providing instructions to electronically display the identified travel information and/or content on the device of the user is performed in accordance with the control parameters received from the user.

15. A computer-readable storage medium that comprises a set of instructions that are executable by at least one processor to cause the at least one processor to perform a method for providing travel information and/or content to a user, the method comprising operations comprising:
determining a location of a user traveling along a route and a velocity of travel of the user;
calculating a relative distance of travel based on the determined velocity,
wherein the relative distance of travel is calculated proportionally to the determined velocity when the determined velocity is below a threshold, and the relative distance of travel is calculated logarithmically to the determined velocity when the determined velocity is above the threshold;
calculating an area of interest based on the location of the user and the relative distance of travel, the area of interest being associated with coordinates on a map and including a triangular area defined by an isosceles triangle,
wherein the location of the user defines a vertex of the isosceles triangle and the relative distance of travel defines a point along a base of the isosceles triangle, the point bisecting the base of the isosceles triangle;
searching at least one database to identify the travel information and/or content within the area of interest, the travel information and/or content being stored in the database and associated with coordinates on the map;
providing, at a first point in time, instructions to electronically display the identified travel information and/or content on a device of the user; and
automatically repeating, at subsequent points in time, the operations in order to electronically display further identified travel information and/or content to the user as the user travels along the route.

16. The computer-implemented method of claim 1, further comprising:
receiving, from the user, control parameters comprising prioritization information for a selection of multiple categories of travel information and/or content; and
wherein providing instructions to electronically display the identified travel information and/or content on the device of the user is performed in accordance with the control parameters received from the user.

17. The computer-implemented method of claim 7, wherein the control parameters further comprise parameters for controlling a frequency of displaying the identified travel information and/or content to the user according to at least one of a time interval or a distance interval.

18. The system of claim 8, wherein the at least one processor is configured by the set of instructions to:
receive, from the user, control parameters comprising prioritization information for a selection of multiple categories of travel information and/or content; and
wherein providing instructions to electronically display the identified travel information and/or content on the device of the user is performed in accordance with the control parameters received from the user.

* * * * *